US008884204B2

(12) United States Patent
Shibata et al.

(10) Patent No.: US 8,884,204 B2
(45) Date of Patent: Nov. 11, 2014

(54) LIGHT-EMITTING ELEMENT DRIVING CIRCUIT HAVING A POTENTIAL CONTROL UNIT AND AN AUXILIARY POTENTIAL CONTROL UNIT

(71) Applicant: Canon Kabushiki Kaisha, Tokyo (JP)

(72) Inventors: Masanori Shibata, Kawasaki (JP); Yoshikazu Yamazaki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/648,872

(22) Filed: Oct. 10, 2012

(65) Prior Publication Data
US 2013/0119244 A1 May 16, 2013

(30) Foreign Application Priority Data

Nov. 10, 2011 (JP) ................................ 2011-246856

(51) Int. Cl.
*G01J 1/32* (2006.01)
*H05B 37/02* (2006.01)
*G01D 5/347* (2006.01)

(52) U.S. Cl.
CPC ............ *G01D 5/347* (2013.01); *G01D 5/34715* (2013.01); *H05B 37/02* (2013.01)
USPC ...................... 250/205; 250/214 R

(58) Field of Classification Search
USPC ......... 250/205, 214 R, 231.13; 315/149–159, 315/245, 307; 362/4, 5, 800
See application file for complete search history.

(56) References Cited

U.S. PATENT DOCUMENTS

| 5,299,170 | A | 3/1994 | Shibata et al. |
| 5,350,269 | A | 9/1994 | Azuma et al. |
| 7,521,971 | B2 | 4/2009 | Yamazaki |
| 7,888,623 | B2 * | 2/2011 | Kawashima et al. ......... 250/205 |
| 7,906,998 | B2 | 3/2011 | Yamazaki |
| 8,085,098 | B2 | 12/2011 | Yamazaki |
| 8,334,713 | B2 | 12/2012 | Yamazaki |
| 2012/0206197 | A1 | 8/2012 | Yamazaki |
| 2012/0218035 | A1 | 8/2012 | Yamazaki |

FOREIGN PATENT DOCUMENTS

JP          10-093171 A        4/1998

* cited by examiner

*Primary Examiner* — Que T Le
(74) *Attorney, Agent, or Firm* — Fitzpatrick, Cella, Harper & Scinto

(57) ABSTRACT

A light-emitting element driving circuit comprising, a light-emitting element, a driving unit which has a control terminal and is configured to drive the light-emitting element according to a potential of the control terminal, a node connected to the control terminal, a monitor configured to monitor an emitted light amount of the light-emitting element, a potential control unit configured to control a potential of the node so that the emitted light amount of the light-emitting element approaches a target value, and an auxiliary potential control unit configured to assist potential control of the node by the potential control unit when a difference between the emitted light amount of the light-emitting element detected by the monitor and the target value is larger than a reference amount.

8 Claims, 11 Drawing Sheets

F I G. 10
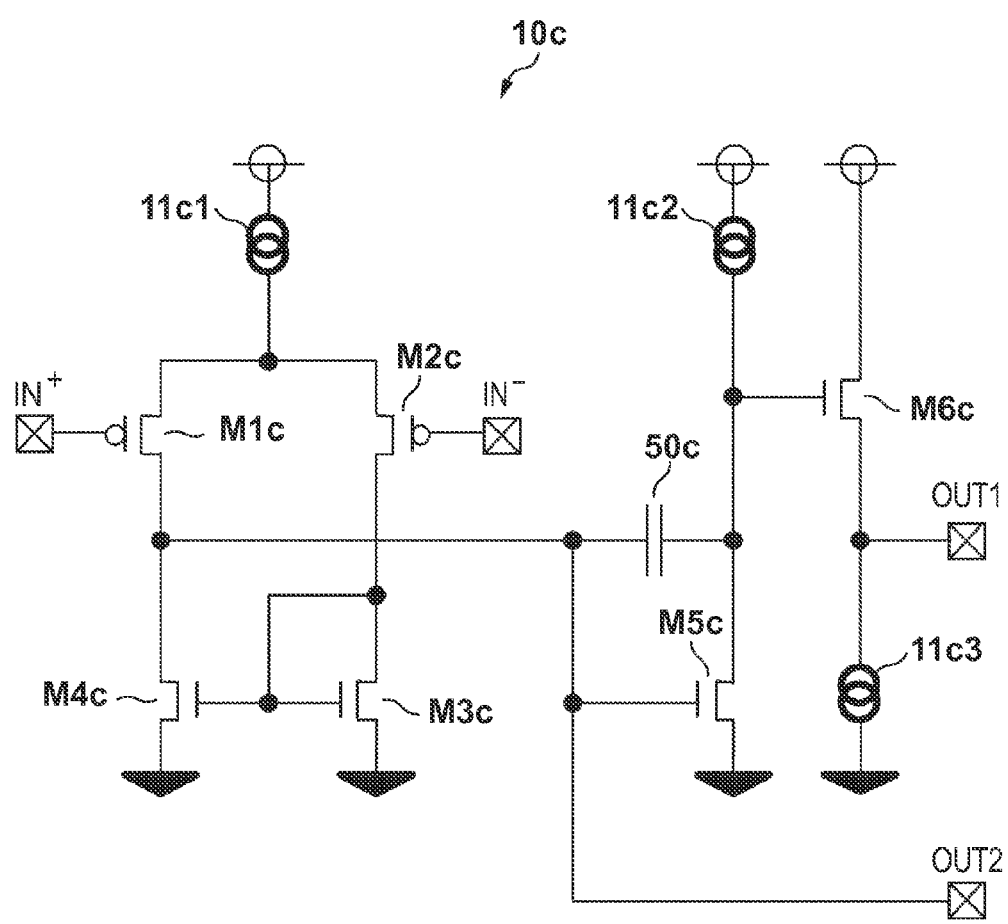

LIGHT-EMITTING ELEMENT DRIVING CIRCUIT HAVING A POTENTIAL CONTROL UNIT AND AN AUXILIARY POTENTIAL CONTROL UNIT

BACKGROUND OF THE INVENTION

1. Field of the Invention

The present invention relates to a light-emitting element driving circuit.

2. Description of the Related Art

A light-emitting element used as a light source requires an APC (Auto Power Control) circuit used to maintain a constant emitted light amount in, for example, use application of an optical encoder or the like. As the conventional APC circuit, for example, a light-emitting element driving circuit, which monitors the emitted light amount of a light-emitting element and controls driving of the light-emitting element so as to approach an emitted light amount as a target value, is known. In order to shorten a start-up time of this light-emitting element driving circuit and to speed up an APC operation, it is required to control a potential of a driving control node of the light-emitting element within a short period of time. According to Japanese Patent Laid-Open No. 10-93171, prior to the APC operation, a capacitor connected to the driving control node of the light-emitting element is charged in advance to a predetermined voltage, and only a difference from a reference voltage is charged/discharged at the time of the APC operation, thus speeding up the APC operation. This can be attained using an operational amplifier as an analog buffer before the APC operation, and using it as a comparator at the time of the APC operation.

With a technique disclosed in Japanese Patent Laid-Open No. 10-93171, the single operational amplifier is used in both charging operations before and at the time of the APC operation, and its charging speed does not exceed the drivability of the operational amplifier. Therefore, speeding-up can be achieved at the time of the APC operation, but a charging time of the capacitor is required before the APC operation, thus requiring a considerably long start-up time. However, it is desirable for the light-emitting element driving circuit to be quickly started up and to execute a high-speed APC operation.

SUMMARY OF THE INVENTION

The present invention provides a technique advantageous to shorten a start-up time of a light-emitting element driving circuit, and to speed up an APC operation.

One of the aspects of the present invention provides a light-emitting element driving circuit comprising, a light-emitting element, a driving unit which has a control terminal and is configured to drive the light-emitting element according to a potential of the control terminal, a node connected to the control terminal, a monitor configured to monitor an emitted light amount of the light-emitting element, a potential control unit configured to control a potential of the node so that the emitted light amount of the light-emitting element approaches a target value, and an auxiliary potential control unit configured to assist potential control of the node by the potential control unit when a difference between the emitted light amount of the light-emitting element detected by the monitor and the target value is larger than a reference amount.

Further features of the present invention will become apparent from the following description of exemplary embodiments with reference to the attached drawings.

BRIEF DESCRIPTION OF THE DRAWINGS

FIG. 10 is a circuit diagram for explaining an example of the circuit arrangement of a potential control unit according to the third embodiment;

DESCRIPTION OF THE EMBODIMENTS

First Embodiment

Figure 1:
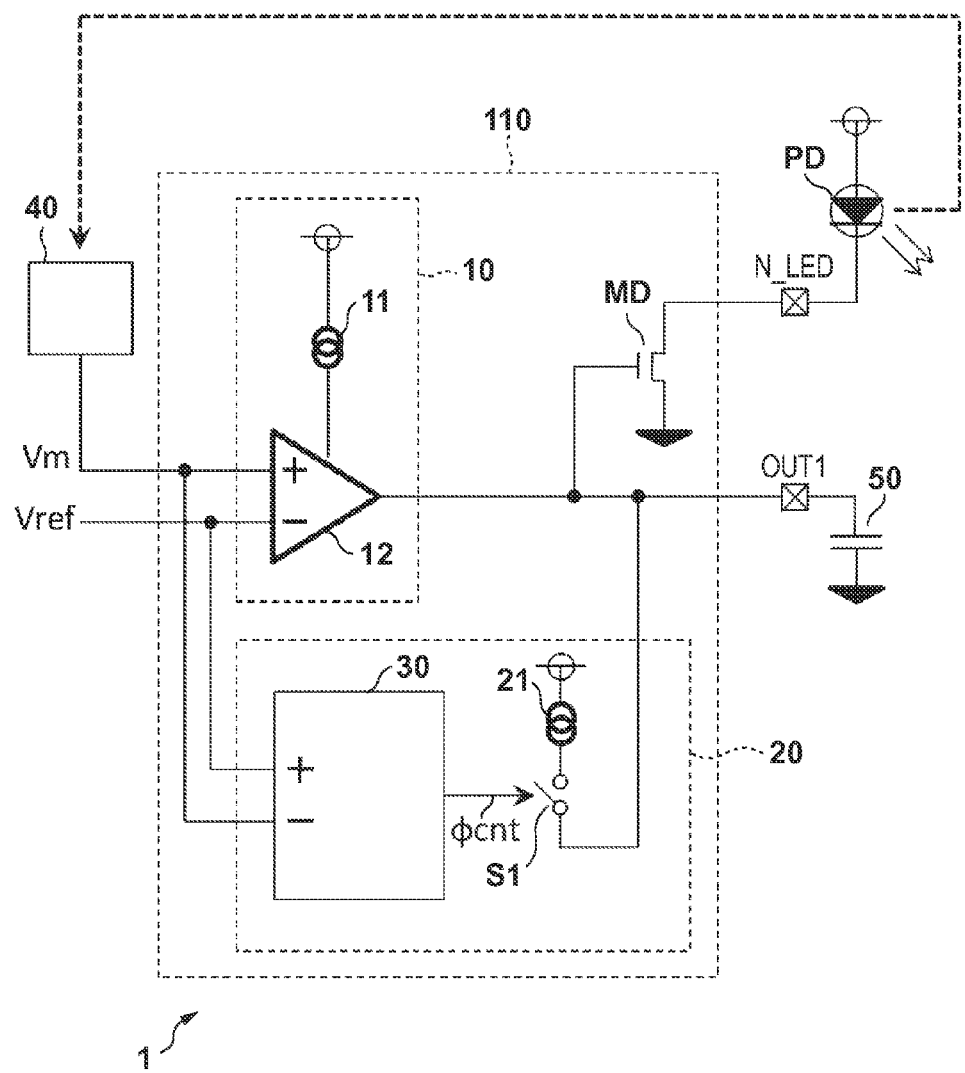
FIG. 1 is a circuit diagram for explaining a light-emitting element driving circuit according to the first embodiment.
Figure 2:
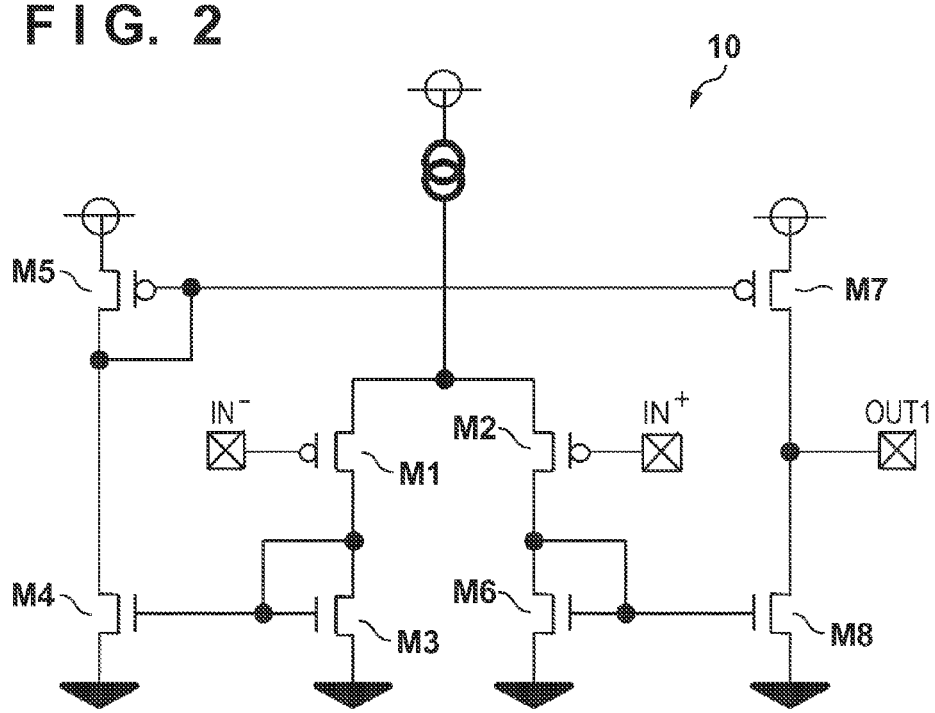
FIG. 2 is a circuit diagram for explaining an example of the circuit arrangement of a potential control unit.

A light-emitting element driving circuit 1 according to the first embodiment of the present invention will be described below with reference to FIGS. 1 to 5. As exemplified in FIG. 1, the light-emitting element driving circuit 1 can include a light-emitting element PD, transistor MD, monitor 40, potential control unit 10, and auxiliary potential control unit 20. Also, the light-emitting element driving circuit 1 can include a capacitor 50. This capacitor 50 can be connected to a terminal (node) OUT1 as an output of the potential control unit 10. The light-emitting element PD is connected to a terminal N_LED as an externally connected member in FIG. 1. The transistor MD is used as a driving unit for driving the light-emitting element PD, and can drive the light-emitting element PD when a potential of the gate (control terminal) connected to the terminal OUT1 exceeds a threshold voltage. The monitor 40 can monitor an emitted light amount of the light-emitting element PD. This monitoring can be done, for example, when a photoelectric conversion element included in the monitor 40 converts an emitted light amount of the light-emitting element PD into a voltage. The potential control unit 10 includes a comparison unit 12 and current source 11, and can control the potential of the terminal OUT1. The potential of the terminal OUT1 is controlled so that a voltage Vm according to the emitted light amount of the light-emitting element PD monitored by the monitor 40 approaches a predetermined reference potential Vref when the comparison unit 12 compares Vm and Vref. That is, the potential of the terminal OUT1 is controlled by charging/discharging the capacitor 50 by the current source 11. In this case, the reference potential Vref is a voltage corresponding to a light amount as a target value. The potential control unit 10 can be configured by a circuit shown in, for example, FIG. 2.

The auxiliary potential control unit 20 can assist the potential control of the terminal OUT1 by the potential control unit 10. This assisting can be executed, for example, when the voltage Vm according to the emitted light amount of the light-emitting element PD is compared with the reference potential Vref, and their difference is larger than a reference value. The auxiliary potential control unit 20 can include, for example, an auxiliary control logic unit 30, auxiliary current source 21, and switch S1. The auxiliary control logic unit 30 sets the switch S1 in a conductive state when the difference between the voltages Vm and Vref is larger than the reference value, thereby starting to charge the capacitor 50 by the auxiliary current source 21. Thus, the auxiliary potential control unit 20 can assist the potential control of the terminal OUT1 by the potential control unit 10. In this case, the auxiliary current source 21 of the auxiliary potential control unit 20 preferably has drivability larger than the current source 11 of the potential control unit 10.

Figure 3:
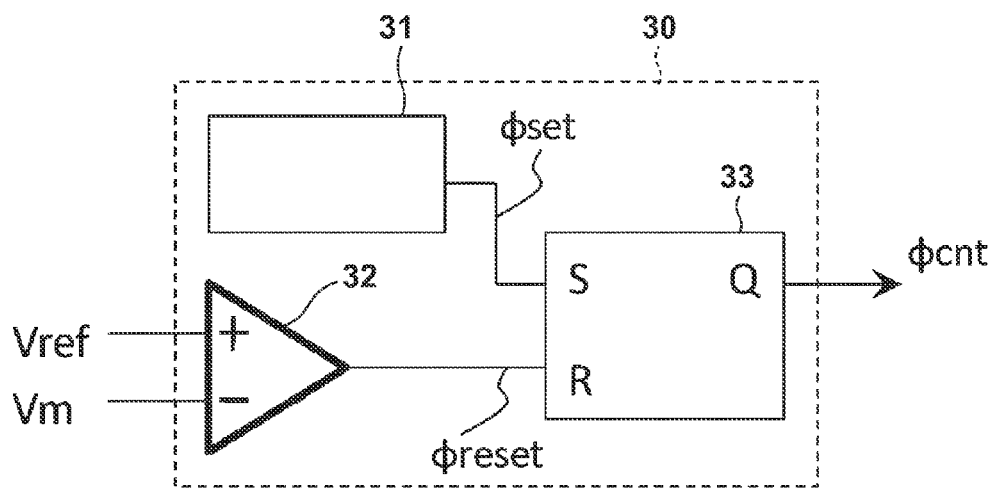
FIG. 3 is a circuit diagram for explaining an example of the circuit arrangement of a logic unit of an auxiliary potential control unit.

FIG. 3 shows an example of the circuit arrangement of the auxiliary control logic unit 30. The auxiliary control logic unit 30 includes a comparison unit 32, start-up unit 31, and RS flip-flop (to be referred to as "RS-FF" hereinafter) 33. The comparison unit 32 compares the voltage Vm according to the emitted light amount of the light-emitting element PD with the reference potential Vref. This comparison result is input to a Reset terminal of the RS-FF 33 via a wiring φreset. The start-up unit 31 outputs a detection signal pulse when it detects a leading edge of a power supply. This pulse is input to a Set terminal of the RS-FF 33 via a wiring φset. The RS-FF 33 can output a control signal of the switch S1 via a wiring φcnt in accordance with these inputs. For example, the switch S1 is set in a conductive state when φcnt is high or in a non-conductive state when φcnt is low.

Figure 4:
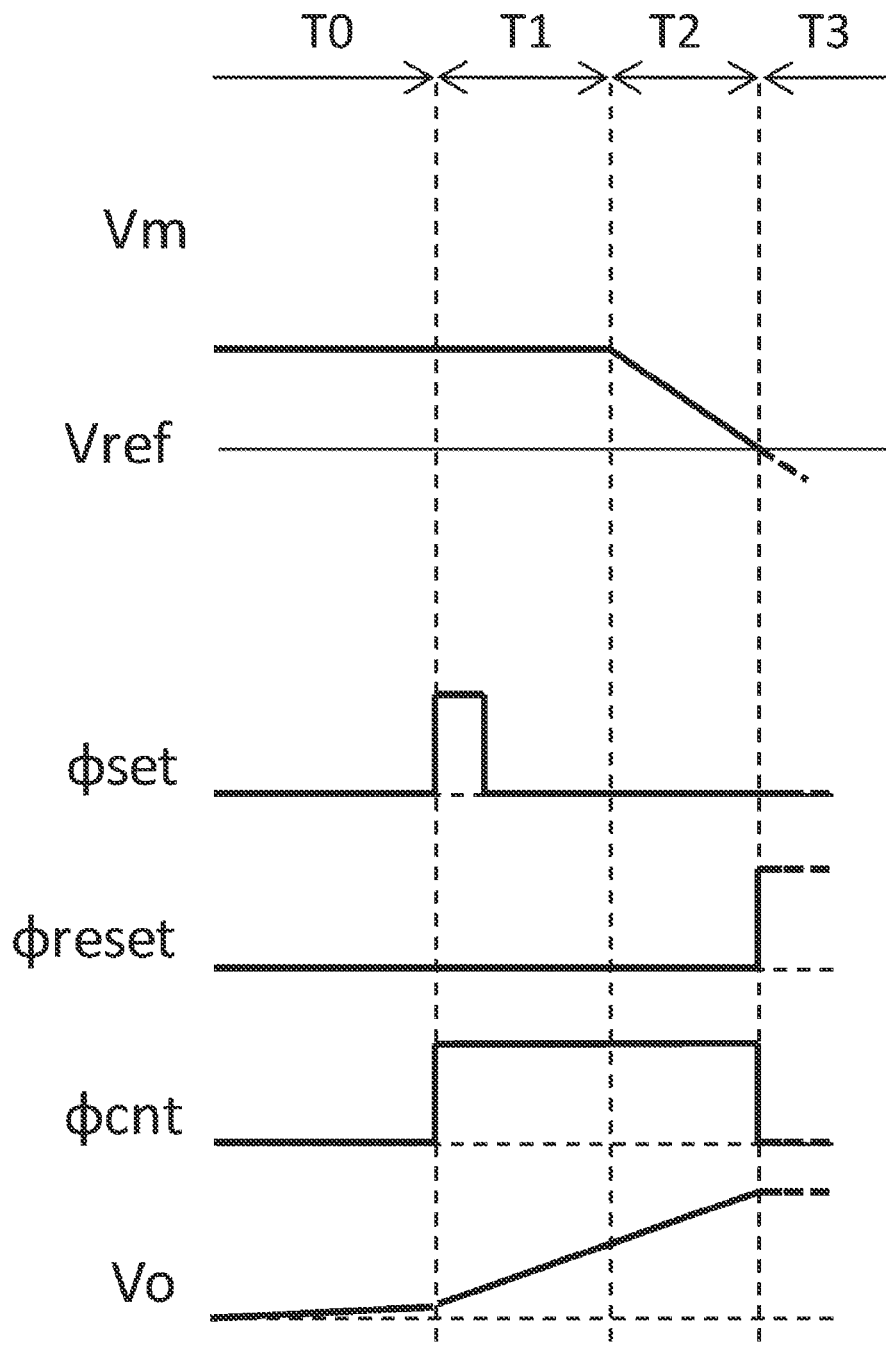
FIG. 4 is an operation timing chart of the light-emitting element driving circuit according to the first embodiment.

FIG. 4 is an operation timing chart of the auxiliary control logic unit 30. FIG. 4 shows potentials of the voltage Vm according to the emitted light amount of the light-emitting element PD, reference potential Vref, the wiring φreset, the wiring φcnt, and a potential Vo of the terminal OUT1. During a period T0, when an initial state of Vm is, for example, higher than Vref, the potential control unit 10 controls the potential of the terminal OUT1 using the current source 11, and Vo can rise moderately. During a period T1, the start-up unit 31 outputs a detection signal pulse by detecting a leading edge of a power supply, and φset goes high. Therefore, φcnt goes high, and the switch S1 is set in a conductive state. Then, the auxiliary potential control unit 20 begins to assist the control of the potential Vo of the terminal OUT1. More specifically, the auxiliary current source 21 of the auxiliary potential control unit 20 begins to charge the capacitor 50. When the auxiliary current source 21 has drivability larger than the current source 11 of the potential control unit 10, Vo can rise steeply. During a period T2, Vo exceeds the threshold voltage of the transistor MD, and the transistor MD can drive the light-emitting element PD. Thus, the monitor 40 receives light emitted by the light-emitting element PD, and Vm can fall accordingly. During a certain period, when Vm falls below Vref, φreset goes high. Assume that this period is T3. Then, φcnt goes low, the switch S1 is set in a non-conductive state, and the auxiliary potential control unit 20 can end assisting of the potential control of the terminal OUT1 using the auxiliary current source 21. With the aforementioned control, the start-up time of the light-emitting element driving circuit 1 can be shortened. In this manner, the light-emitting element driving circuit 1 compares the emitted light amount of the light-emitting element PD with the target value, and when their difference is larger than the reference amount, it can assist the potential control of the terminal OUT1 using the auxiliary current source 21. Then, when this difference is smaller than the reference amount, the circuit 1 can suspend the assisting.

The light-emitting element driving circuit 1 can then shift to an APC operation. At this time, when the difference between Vm and Vref is larger than the reference value, the start-up unit 31 can output a detection pulse (φset=high). In response to this pulse, the auxiliary potential control unit 20 assists the potential control of the terminal OUT1 of the potential control unit 10, thus speeding up the APC operation. After that, when Vm falls below Vref, φreset goes high, and assisting of the auxiliary potential control unit 20 can be suspended in the same manner as described above.

In this way, the potential control unit 10 can control the control terminal (gate potential of the transistor MD) of the driving unit used to drive the light-emitting element PD so that the emitted light amount of the light-emitting element PD approaches the target value. On the other hand, when the difference between the emitted light amount of the light-emitting element PD and the target value is larger than the reference amount, this control can be done within a short period of time via assisting of the auxiliary potential control unit 20 having larger drivability than the potential control unit 10. As for this drivability, for example, when a start-up time of the light-emitting element driving circuit 1 is shortened to 1/10 of the conventional circuit, the drivability of the auxiliary current source 21 of the auxiliary potential control unit 20 can be set to be larger by 10 times than the current source 11 of the potential control unit 10. With the aforementioned control, the start-up time of the light-emitting element driving circuit 1 can be shortened, and the APC operation can be speeded up simultaneously.

Second Embodiment

Figure 6:
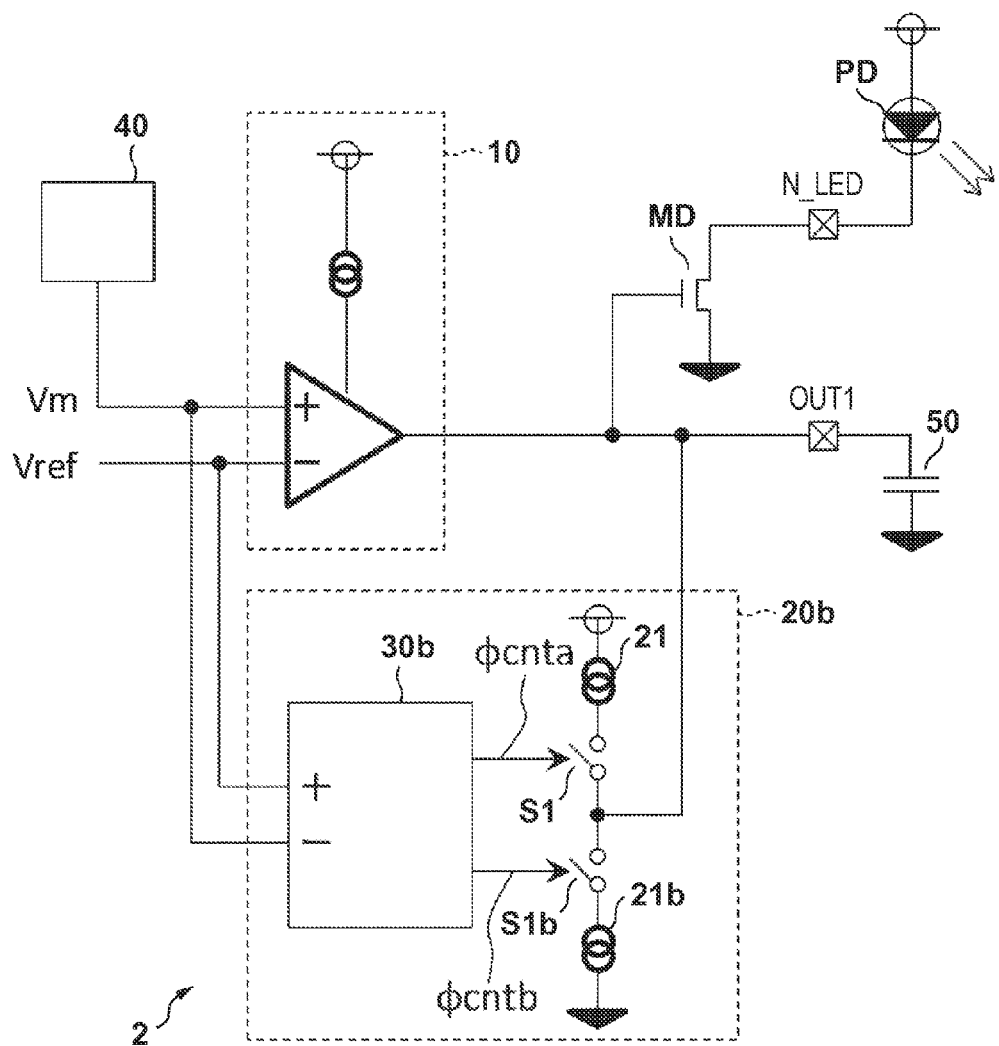
FIG. 6 is a circuit diagram for explaining a light-emitting element driving circuit according to the second embodiment.

A light-emitting element driving circuit 2 according to the second embodiment of the present invention will be described below with reference to FIGS. 6 to 8. The light-emitting element driving circuit 2 exemplified in FIG. 6 uses an auxiliary potential control unit 20b which includes an auxiliary current source 21b in addition to the auxiliary current source 21 unlike in the first embodiment. With this arrangement, both charging and discharging of the capacitor 50 can be attained, and assisting of the potential control of the terminal OUT1 by the auxiliary potential control unit 20b has a higher function. An output signal from an auxiliary control logic unit 30b can control switches S1 and S1b respectively connected to the auxiliary current sources 21 and 21b via wirings φcnta and φcntb. For example, when φcnta and φcntb go high, the switches S1 and S1b are respectively set in a conductive state. In this embodiment, the auxiliary current sources 21 and 21b of the auxiliary potential control unit 20b preferably have larger drivability than the current source 11 of the potential control unit 10.

Figure 7:
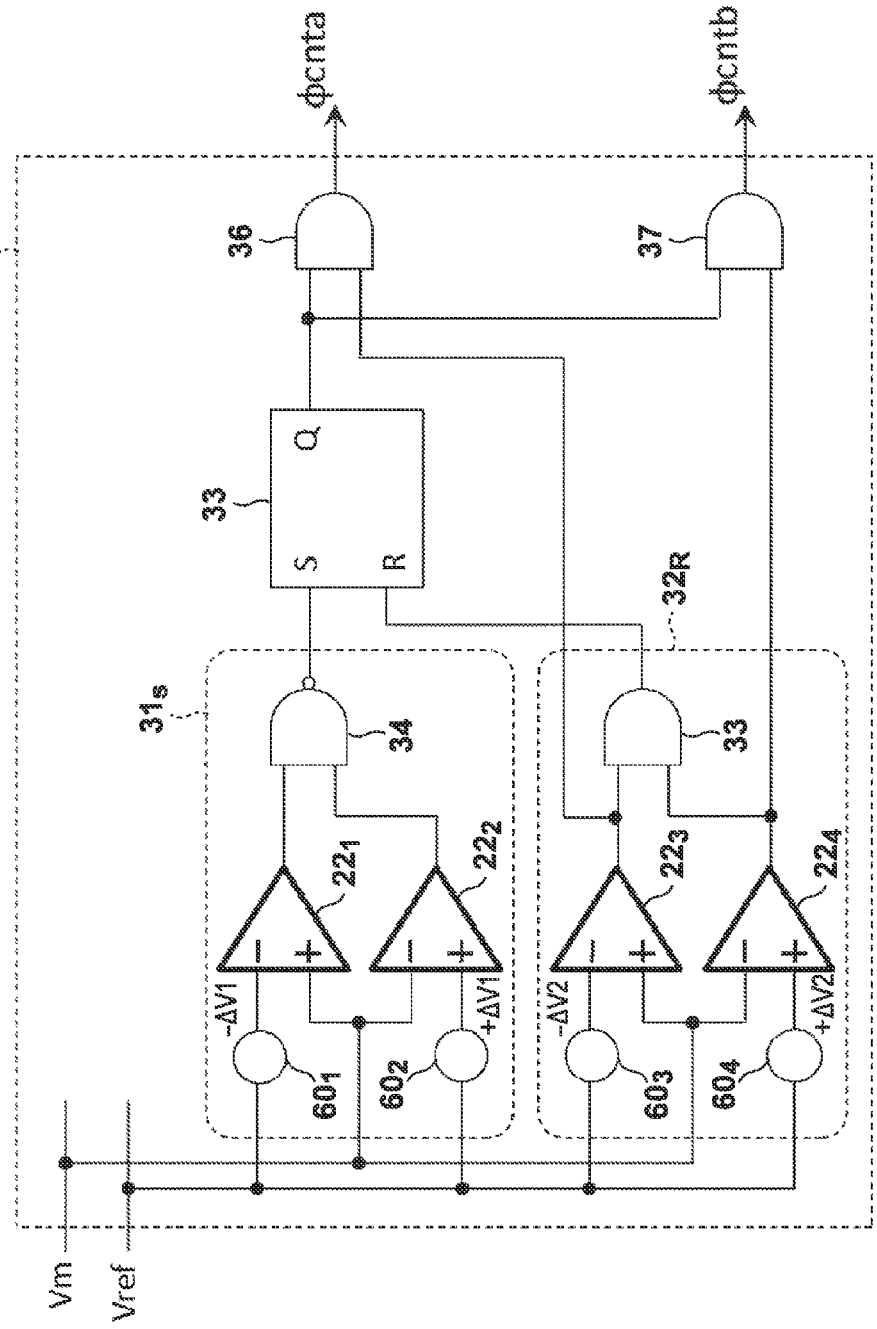
FIG. 7 is a circuit diagram for explaining an example of the circuit arrangement of a logic unit of an auxiliary potential control unit.

FIG. 7 shows an example of the circuit arrangement of the auxiliary control logic unit 30b. In FIG. 7, a logic unit 31$_S$ using offset circuits 60$_1$ and 60$_2$, comparators 22$_1$ and 22$_2$, and a NAND gate 34 corresponds to the start-up unit 31 in FIG. 3. Also, a logic unit 32$_R$ using offset circuits 60$_3$ and 60$_4$, comparators 22$_3$ and 22$_4$, and an AND gate 33 corresponds to the comparison unit 32 in FIG. 3. An inverting input terminal (−) of the comparator 22$_1$ receives Vref−ΔV1. A non-inverting input terminal (+) of the comparator 22$_2$ receives Vref+ΔV1. An inverting input terminal (−) of the comparator 22$_3$ receives Vref−ΔV2. A non-inverting input terminal (+) of the comparator $22_4$ receives Vref+ΔV2. In this case, ΔV1 and ΔV2 are offset voltages, and ΔV1>ΔV2. A non-inverting input terminal (+) of the comparator $22_2$, an inverting input terminal (−) of the comparator $22_2$, a non-inverting input terminal (+) of the comparator $22_3$, and an inverting input terminal (−) of the comparator $22_4$ receive Vm. The auxiliary control logic unit 30b further includes an RS-FF 33 and AND gates 36 and 37.

Figure 8:
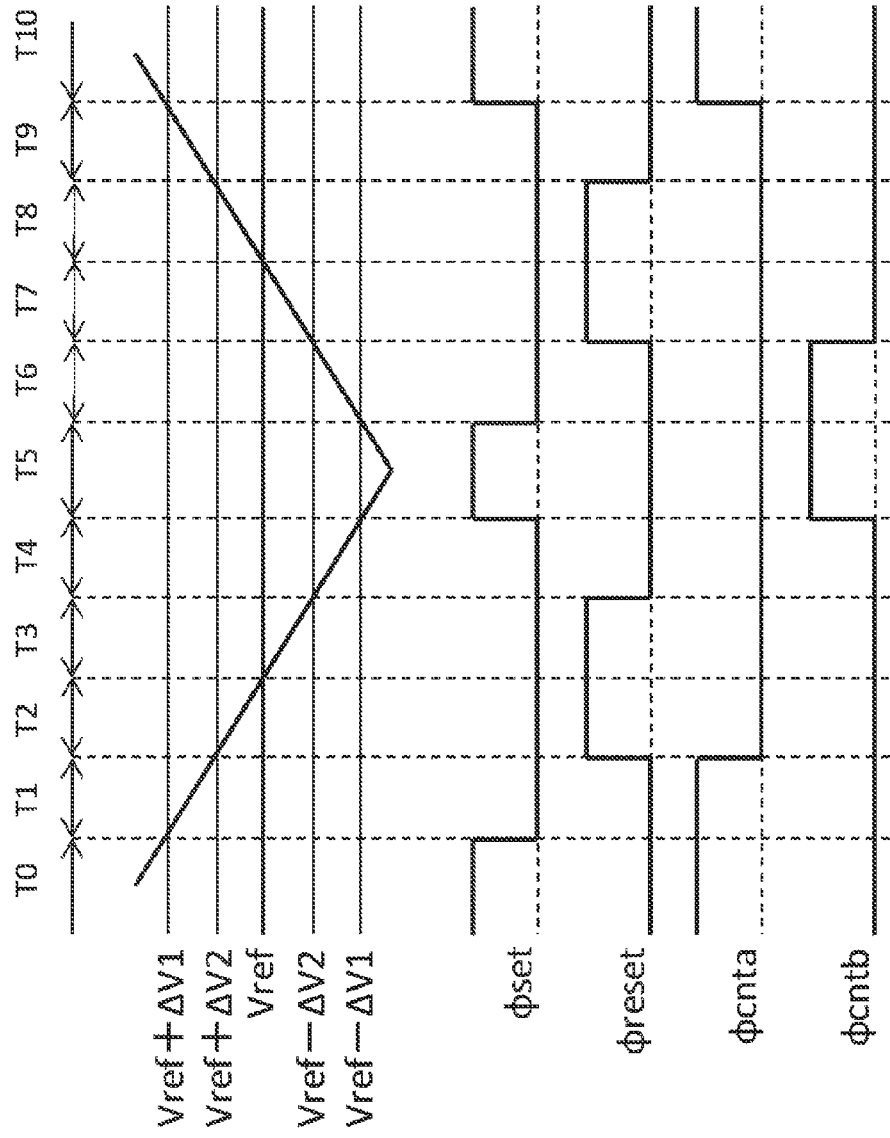
FIG. 8 is a chart for explaining the characteristics of the logic unit of the auxiliary potential control unit.

FIG. 8 shows the output characteristics of the auxiliary control logic unit 30b to indicate states of ϕset, ϕreset, ϕcnta, and ϕcntb with respect to the input Vm. FIG. 8 illustrates respective waveforms when, for example, the input Vm falls from Vref+ΔV1 to Vref−ΔV1 across periods T0 to T5, and rises from Vref−ΔV1 to Vref+ΔV1 across periods T5 to T10.

During a period T0, ϕset is high, and ϕcnta is also high. Thus, the switch S1 is set in a conductive state, and the auxiliary current source 21 can begin to charge the capacitor 50. During a period T1, ϕset goes low. ϕcnta is kept at high, and charging of the capacitor 50 by the auxiliary current source 21 can be continued. During periods T2 and T3, ϕreset goes high, and ϕcnta goes low. Then, the switch S1 is set in a non-conductive state, and charging of the capacitor 50 by the auxiliary current source 21 can be suspended. During a period T4, ϕreset goes low. During a period T5, ϕset goes high, and ϕcntb goes high. Then, the switch S1b is set in a conductive state, and the auxiliary current source 21b can begin to discharge the capacitor 50. During a period T6, ϕset goes low. ϕcntb is kept at high, and discharging from the capacitor 50 by the auxiliary current source 21b can be continued. During periods T7 and T8, ϕreset goes high, and ϕcntb goes low. Thus, the switch S1b is set in a non-conductive state, and discharging from the capacitor 50 by the auxiliary current source 21b can be suspended. During a period T9, ϕreset goes low. During a period T10, ϕset goes high, and the same operation as that during the period T0 is executed.

As described above, the light-emitting element driving circuit 2 compares the emitted light amount of the light-emitting element PD with the target value, and when their difference is larger than a first reference amount (ΔV1), it can begin to assist the potential control of the terminal OUT1 using the auxiliary current source 21 or 21b. Then, when this difference is smaller than a second reference amount (ΔV2), the assisting can be suspended. In this case, the auxiliary current source 21 or 21b can assist so that the emitted light amount of the light-emitting element PD approaches the target value. In this way, the start-up time of the light-emitting element driving circuit 2 can be shortened, and the APC operation can also be speeded up.

Third Embodiment

Figure 9:
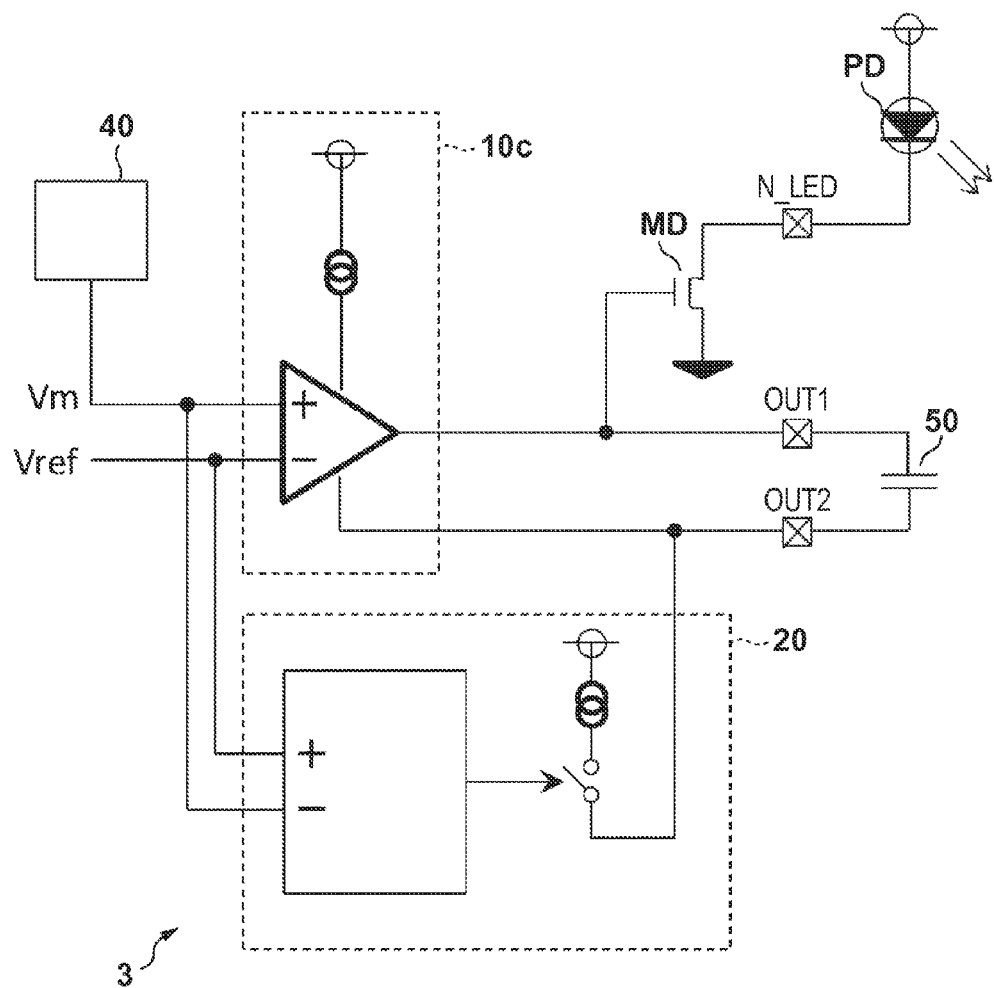
FIG. 9 is a circuit diagram for explaining a light-emitting element driving circuit according to the third embodiment.

A light-emitting element driving circuit 3 according to the third embodiment of the present invention will be described below with reference to FIGS. 9 and 10. The light-emitting element driving circuit 3 exemplified in FIG. 9 uses a potential control unit 10c having an arrangement exemplified in FIG. 10 unlike in the first embodiment. Also, in the light-emitting element driving circuit 3, a connection relationship of the capacitor 50 is different from the first embodiment.

The potential control unit 10c includes a plurality of transistors M1c to M6c, an internal phase compensation capacitor 50c, and a plurality of current sources 11c1 to 11c3. To the terminal OUT1, a source-follower output of the transistor M6c is connected. The capacitor 50 can be connected between the terminal OUT1 and a terminal OUT2. The gate of the transistor M1c is a non-inverting input terminal (+), and can receive an output Vm from the monitor 40. The gate of the transistor M2c is an inverting input terminal (−), and can receive a reference potential Vref. When the light amount of the light-emitting element PD is small (Vm>Vref), the gate voltage of the transistor M1c is higher than that of the transistor M2c. Therefore, the potential control unit 10c operates to raise the potential of the terminal OUT1. The voltage rising speed of the terminal OUT1 depends on drivability for charging the capacitor 50 connected between the terminals OUT1 and OUT2, and that drivability is nearly equal to that of the current source 11c1 connected to the sources of the transistors M1c and M2c. Since an APC operation is the same as the first embodiment, a description thereof will not be repeated.

Figure 5:
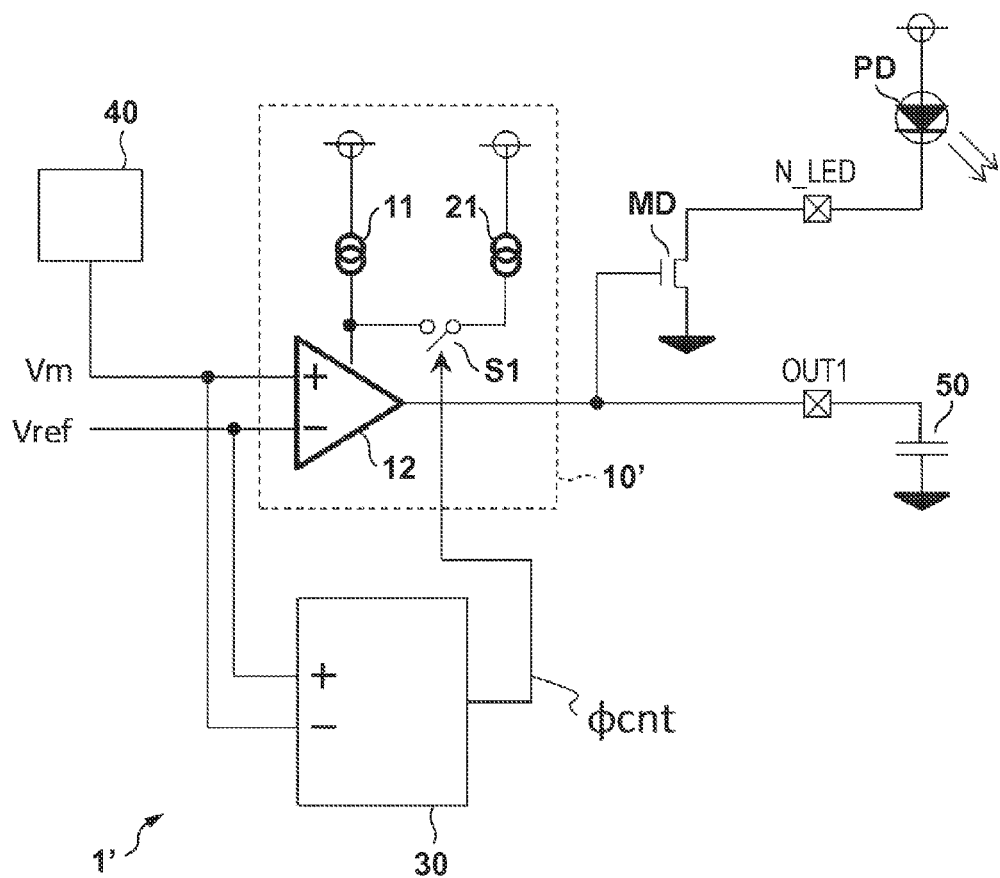
FIG. 5 is a circuit diagram showing a modification of the light-emitting element driving circuit according to the first embodiment.

The light-emitting element driving circuits of the three embodiments have been explained, but the present invention is not limited to them, purposes, states, use applications, functions, and other specifications can be changed as needed, and the present invention can be practiced by other embodiments. For example, the auxiliary current source 21 may be connected in parallel with the current source 11 of the potential control unit 10, as shown in FIG. 5, thus obtaining the same effects. For example, it is effective to use the comparison unit 32 having hysteresis characteristics so as to prevent its output from varying due to noise. For example, in FIG. 4, the case has been examined wherein the initial state of Vm is higher than Vref. Conversely, the functions and polarities of the respective blocks can be changed as needed to attain the same operation even when the initial state of Vm is lower than Vref. For example, in the auxiliary control logic unit 30b shown in FIG. 7, offset voltages are generated using the offset circuits $60_1$ to $60_4$, but they may be generated using transistors as differential pairs having different sizes.

Figure 11:
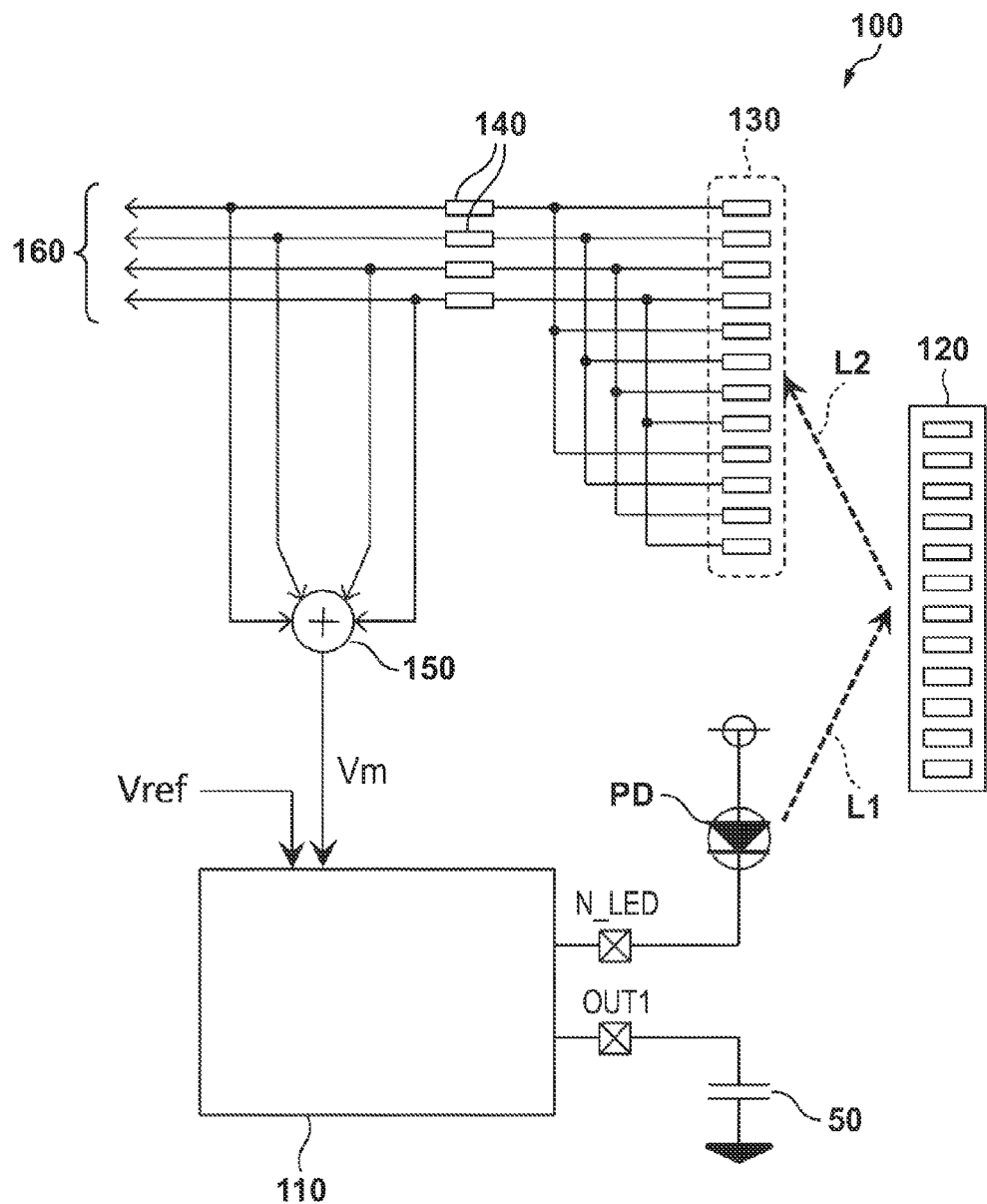
FIG. 11 is a circuit diagram for explaining an optical encoder using a light-emitting element driving circuit according to the present invention.

As exemplified in FIG. 11, the light-emitting element driving circuit according to the present invention can be used in an optical encoder 100. The optical encoder 100 has a circuit portion 110 (FIG. 1) including, for example, the transistor MD, potential control unit 10, and auxiliary potential control unit 20 of the light-emitting element driving circuit 1, a reflective optical scale 120, and a line sensor 130. The reflective optical scale 120 can reflect emitted light L1 from the light-emitting element PD used as a light source. The line sensor 130 is a sensor unit which detects reflected light L2 from the reflective optical scale 120. A current output from the line sensor 130, which detects the reflected light L2, is converted into a voltage by, for example, an I/V conversion circuit 140, and the converted voltage undergoes arithmetic processing, thus obtaining information 160 associated with a lens position. Also, this signal converted into the voltage is added by, for example, an adder 150, and can be input to the circuit portion 110 as a monitor signal Vm. In this way, the light-emitting element driving circuit 1 can monitor the emitted light amount of the light-emitting element.

Figure 12:
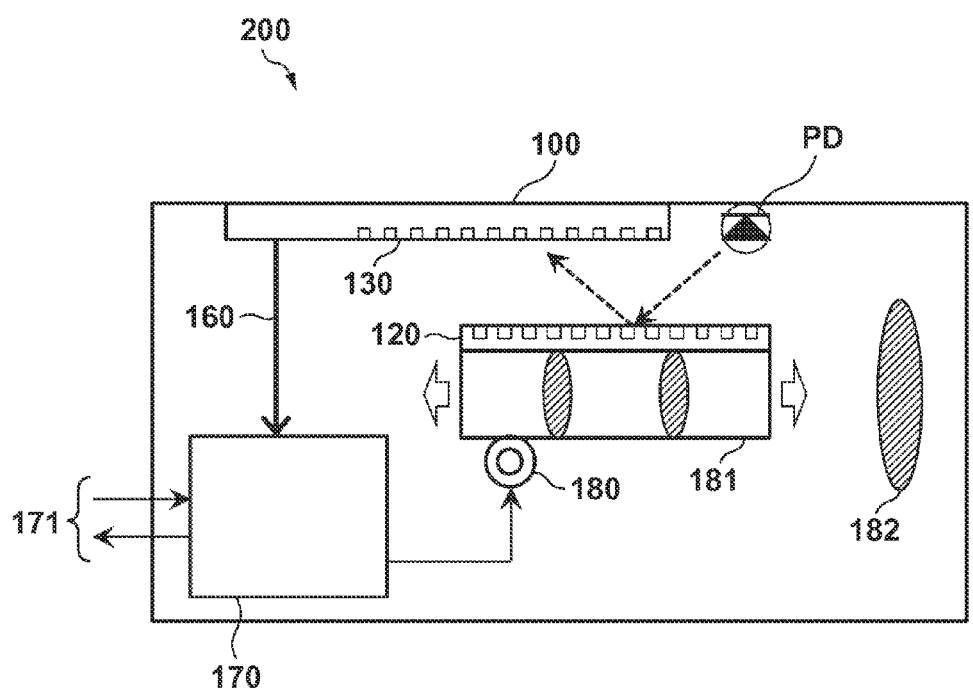
FIG. 12 is a view for explaining a system for adjusting a lens position using an optical encoder.

FIG. 12 is a view for explaining an example of a system for adjusting a lens position using the optical encoder 100. FIG. 12 shows a lens main body 200 which includes the light-emitting element PD, the reflective optical scale 120, the line sensor 130, a lens 182, a movable lens barrel 181 having other lenses, a motor 180 for driving the lens barrel 181, and an arithmetic unit 170. The arithmetic unit 170 executes arithmetic processing for the aforementioned output information 160 of the optical encoder 100 according to a control signal 171 associated with focus detection, thereby obtaining information associated with a lens position. The motor 180 is controlled according to this information to drive the lens barrel 181, and a camera can adjust the lens position to attain an in-focus state.

The light-emitting element driving circuit included in the camera has been described. However, the concept of a camera includes not only an apparatus primarily intended to an image capturing operation but also an apparatus which includes an image capturing function as an option (for example, a personal computer or portable terminal). Also, the camera can include an optical encoder using the light-emitting element driving circuit exemplified as each of the above embodiments, a solid-state image sensor, and a processing unit which processes a signal output from this solid-state image sensor. This processing unit can include, for example, an A/D converter, and a processor for processing digital data output from this A/D converter. Processing of information associated with a lens position may be executed by this processing unit, and changes can be made as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-246856, filed Nov. 10, 2011, which is hereby incorporated by reference herein in its entirety.

What is claimed is:

1. A light-emitting element driving circuit comprising:
a light-emitting element;
a driving unit which has a control terminal and is configured to drive said light-emitting element according to a potential of the control terminal;
a node connected to the control terminal;
a monitor configured to monitor an emitted light amount of said light-emitting element;
a potential control unit configured to control a potential of said node so that the emitted light amount of said light-emitting element approaches a target value; and
an auxiliary potential control unit configured to assist potential control of said node by said potential control unit when a difference between the emitted light amount of said light-emitting element detected by said monitor and the target value is larger than a reference amount.

2. The circuit according to claim 1, further comprising a capacitor connected to said node.

3. The circuit according to claim 1, wherein said auxiliary potential control unit has drivability larger than said potential control unit.

4. The circuit according to claim 1, wherein said auxiliary potential control unit includes a current source, and
when the difference between the emitted light amount of said light-emitting element and the target value is larger than the reference amount, the current source supplies a current to said node so as to reduce the difference.

5. The circuit according to claim 4, wherein when the difference between the emitted light amount of said light-emitting element and the target value becomes not more than the reference amount, the current source ends supply of the current.

6. An optical encoder comprising:
a light-emitting element driving circuit of claim 1;
a reflective optical scale configured to reflect emitted light of a light-emitting element included in said light-emitting element driving circuit; and
a sensor unit configured to detect reflected light from said reflective optical sensor,
wherein information of a lens position is obtained by applying arithmetic processing to an output from said sensor unit.

7. A camera for adjusting a lens position according to an output from an optical encoder of claim 6.

8. A control method of a light-emitting element driving circuit,
the light-emitting element driving circuit comprising: a light-emitting element; a driving unit which has a control terminal and is configured to drive the light-emitting element according to a potential of the control terminal; a node connected to the control terminal; a monitor configured to monitor an emitted light amount of the light-emitting element; a potential control unit configured to control a potential of the node; and an auxiliary potential control unit configured to assist potential control of the node by the potential control unit,
the method comprising:
a step of controlling the potential control unit so that the emitted light amount of the light-emitting element approaches a target value; and
a step of controlling the auxiliary potential control unit to assist the potential control unit when a difference between the emitted light amount of the light-emitting element detected by the monitor and the target value is larger than a reference amount.

* * * * *